(12) United States Patent
Fernandez-Corbaton et al.

(10) Patent No.: US 7,474,994 B2
(45) Date of Patent: *Jan. 6, 2009

(54) SYSTEM AND METHOD FOR WIRELESS SIGNAL TIME OF ARRIVAL

(75) Inventors: Ivan Fernandez-Corbaton, San Diego, CA (US); Jeremy Stein, Haifa (IL); Roland R. Rick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 768 days.

This patent is subject to a terminal disclaimer.

(21) Appl. No.: 10/057,441

(22) Filed: Jan. 25, 2002

(65) Prior Publication Data

US 2003/0115027 A1  Jun. 19, 2003

Related U.S. Application Data

(60) Provisional application No. 60/340,189, filed on Dec. 14, 2001.

(51) Int. Cl.
*G06F 17/10* (2006.01)
(52) U.S. Cl. .................. 703/2; 375/343; 455/456.1
(58) Field of Classification Search .............. 703/2; 375/142, 150, 343, 130, 147, 148, 152, 316, 375/340, 341; 704/216; 342/387, 465; 370/208, 370/337; 455/65, 224, 456.1, 456.2, 504, 455/512, 517
See application file for complete search history.

(56) References Cited

U.S. PATENT DOCUMENTS 4,901,307 A    2/1990 Gilhousen
5,276,706 A *  1/1994 Critchlow ............... 375/343
5,402,450 A *  3/1995 Lennen ................... 375/343

(Continued)

FOREIGN PATENT DOCUMENTS

EP    0933882    8/1999

(Continued)

OTHER PUBLICATIONS

Feiberg et al. EP1089452, "Fractional sample timing error estimation fro W-CDMA".*

(Continued)

*Primary Examiner*—Paul L Rodriguez
*Assistant Examiner*—Carlos Ortiz-Rodriguez
(74) *Attorney, Agent, or Firm*—Andrea L. Mays; Linda G. Gunderson; Thomas R. Rouse

(57) ABSTRACT

A system and method for accurately determining time of arrival using a mathematical model that mimics a correlation function. A correlation value is sampled at a predetermined periodic interval and a maximum correlation value, coinciding with a particular point in time, is determined. The mathematical model uses the maximum measured correlation value and correlation values at adjacent sample points to determine coefficients for the selected mathematical model. The coefficients may be calculated and used to determine the actual peak, which may fall in-between the sample points. The actual peak value is used to accurately determine the time of arrival of a signal. Time of arrival signals from a plurality of remote transmitters are used along with conventional triangulation techniques to accurately determine the location of the wireless unit.

23 Claims, 4 Drawing Sheets

U.S. PATENT DOCUMENTS

| | | | |
|---|---|---|---|
| 5,459,473 A | 10/1995 | Dempster et al. | |
| 5,533,067 A * | 7/1996 | Jamal et al. | 375/341 |
| 5,596,330 A * | 1/1997 | Yokev et al. | 342/387 |
| 5,781,543 A | 7/1998 | Ault | |
| 5,805,648 A | 9/1998 | Sutton | |
| 5,867,527 A * | 2/1999 | Ziv et al. | 375/147 |
| 6,044,105 A * | 3/2000 | Gronemeyer | 375/152 |
| 6,141,374 A * | 10/2000 | Burns | 375/152 |
| 6,157,842 A * | 12/2000 | Karlsson et al. | 455/456.2 |
| 6,208,871 B1 * | 3/2001 | Hall et al. | 455/517 |
| 6,219,345 B1 * | 4/2001 | Clark et al. | 370/337 |
| 6,259,894 B1 * | 7/2001 | Tekinay | 455/65 |
| 6,356,763 B1 * | 3/2002 | Kangas et al. | 455/456.1 |
| 6,453,237 B1 * | 9/2002 | Fuchs et al. | 701/213 |
| 6,469,665 B2 * | 10/2002 | Porcino | 342/387 |
| 6,487,499 B1 * | 11/2002 | Fuchs et al. | 701/213 |
| 6,658,042 B1 * | 12/2003 | Tran et al. | 375/130 |
| 6,667,963 B1 * | 12/2003 | Rantalainen et al. | 370/337 |
| 6,704,352 B1 * | 3/2004 | Johnson | 375/224 |
| 6,738,438 B2 | 5/2004 | Rick | |
| 6,832,090 B2 * | 12/2004 | Riley et al. | 455/446 |
| 6,922,388 B1 * | 7/2005 | Laroia et al. | 370/208 |
| 7,050,814 B2 * | 5/2006 | Al-Housami | 455/452.1 |
| 7,095,813 B2 * | 8/2006 | Amerga et al. | 375/343 |
| 7,197,092 B2 * | 3/2007 | Hernandez et al. | 375/340 |
| 2002/0015439 A1 * | 2/2002 | Kohli et al. | 375/148 |
| 2002/0072855 A1 * | 6/2002 | Fuchs et al. | 701/213 |
| 2002/0183069 A1 * | 12/2002 | Myr | 455/456 |
| 2003/0081661 A1 | 5/2003 | Stein | |
| 2003/0081662 A1 | 5/2003 | Rick | |
| 2003/0087604 A1 | 5/2003 | Stein | |
| 2003/0114170 A1 | 6/2003 | Rick | |
| 2006/0274823 A1 | 12/2006 | Stein | |

FOREIGN PATENT DOCUMENTS

| | | |
|---|---|---|
| EP | 1089452 | 4/2001 |
| JP | 09-325794 | 12/1997 |
| JP | 11-284601 | 10/1999 |
| JP | 2001-313977 | 11/2001 |
| WO | 01074107 | 10/2001 |
| WO | 01078440 | 10/2001 |
| WO | 01081944 | 11/2001 |

OTHER PUBLICATIONS

Kim et al., "Time-of-arrival predicition model for transionospheric EMP", 1995 IEEE.*

* cited by examiner

SYSTEM AND METHOD FOR WIRELESS SIGNAL TIME OF ARRIVAL

RELATED APPLICATIONS

This application claims priority to U.S. Provisional Application No. 60/340,189 filed on Dec. 14, 2001.

BACKGROUND OF THE INVENTION

1. Field of the Invention

The present invention is directed generally to time of arrival estimation and, more particularly, to a system and method for mathematical modeling of a function indicative of time of arrival.

2. Description of the Related Art

Existing position location technologies based on global positioning system (GPS) use a network of satellites in the sky which transmit signals at a known time. A GPS receiver on the ground measures the time of arrival of the signals from each satellite it can detect. The time of arrival, along with the exact location of the satellites and the exact time the signal was transmitted from each satellite is used to triangulate the position of the GPS receiver. A typical GPS receiver requires four satellites to make a triangulation, and the performance of the resulting calculation increases as the number of satellites that can be detected increases.

In an alternative to GPS, an existing network of cellular base stations can be treated as a network of satellites for purposes of position location. Similar to GPS technology, the exact location of each base station, the exact time at which the base station is transmitting a signal, and the time of arrival of the base station signal at a mobile station can be used to triangulate the position of the mobile station. This technique is described by some service providers as advanced forward link trilateration (AFLT). Wireless networks may also be used in conjunction with GPS to determine the location of the mobile station.

A significant problem faced by the mobile station is to measure the time of arrival of the signals that are received from each base station. Different wireless technologies may take different approaches to time of arrival measurements. Code division multiple access (CDMA) is one such technology. CDMA modulation is one of several techniques that allow a large number of system users to share a communication system. It is possible to utilize conventional CDMA modulation techniques as part of an AFLT system.

CDMA modulation techniques are disclosed in U.S. Pat. No. 4,901,307, issued on Feb. 13, 1990, entitled "SPREAD SPECTRUM MULTIPLE ACCESS COMMUNICATION SYSTEM USING SATELLITE OR TERRESTRIAL REPEATERS," which is assigned to the assignee of the present invention, and the disclosure of which is incorporated herein by reference. The above-referenced patent discloses the use of a phase-coherent and chip-synchronous chip sequence that is defined as a pilot chip sequence, or pilot signal. The pilot signal can be used to provide phase and time acquisition and tracking, and multi-path correction.

Methods for acquiring the pilot signals are disclosed in the above-referenced patent and in the following patents: (1) U.S. Pat. No. 5,781,543, issued on Jul. 14, 1998 and entitled "POWER-EFFICIENT ACQUISITION OF A CDMA PILOT SIGNAL;" and (2) U.S. Pat. No. 5,805,648, issued on Sep. 8, 1998 and entitled "METHOD AND APPARATUS FOR PERFORMING SEARCH ACQUISITION IN A CDMA COMMUNICATION SYSTEM," both of which are assigned to the assignee of the present invention and the disclosures thereof are incorporated herein by reference.

When the wireless communication device is first powered on, the device must establish a communication link with a base transceiver station (BTS). The wireless communication device will typically receive pilot signals from a plurality of BTSs. The wireless device will search for the signals from the BTSs and will establish a communication link with a selected BTS to permit the reception and transmission of data, such as audio signals, over the established communication link. The selection of a particular BTS and the actual communication between the wireless communication device and the selected BTS are well known in the art and need not be discussed in detail herein.

As discussed in the above-referenced patents, each BTS broadcasts the same pseudo-noise (PN) code pilot signal, but with a different time offset.

To acquire the pilot signal, the wireless device must synchronize with the time offset and frequency of the signal transmitted by a BTS. The object of a "searcher" process in the wireless device is to find the time offset of the received signal. The searcher uses an estimated frequency. If the estimated frequency is not sufficiently close to the frequency of the pilot signal, the received signal will not be acquired.

When a BTS is properly detected, the output of the searcher is a pulse, which may be considered a correlation pulse. This correlation pulse may be used to measure the time of arrival of the signal from the BTS. However, the accuracy of such time of arrival measurements severely limits the accuracy of the position determination. Therefore, it can be appreciated that there is a significant need for an improved system for estimating time of arrival that increases the accuracy of the position determining process. The present invention provides this and other advantages, as will be apparent from the following detailed description and accompanying figures.

BRIEF SUMMARY OF THE INVENTION

The present invention is embodied in a system and method for accurately determining time of arrival of signals in a wireless communication system. In an exemplary embodiment, the system comprises a searcher to analyze received signals and to determine therefrom a correlation signal level at predetermined points in time. The searcher determines a maximum signal level at a selected one of the predetermined points in time. A modeling processor generates a mathematical model of a predetermined response function using the maximum signal level and correlation signal levels from predetermined points in time adjacent the selected time. The modeling processor uses the mathematical model to determine a time associated with a peak correlation signal level.

In one embodiment, the correlation signal levels are based on received signal strength of the received signals. The maximum signal level in correlation signal levels from predetermined points in time adjacent the selected time may be used to determine coefficients in the mathematical model. In one embodiment thereof, the coefficients in the mathematical model are used to determine a time associate with a peak value of the mathematical model.

In one embodiment, the mathematical model is a second-order mathematical function. The second-order mathematical function may have three coefficients, the maximum signal level and two correlation signal levels from predetermined points in time adjacent the selected time being used to determine the three coefficients in the second-order mathematical model. Alternatively, a mathematical model greater than a second-order mathematical model may be used.

DETAILED DESCRIPTION OF THE INVENTION

Figure 1:
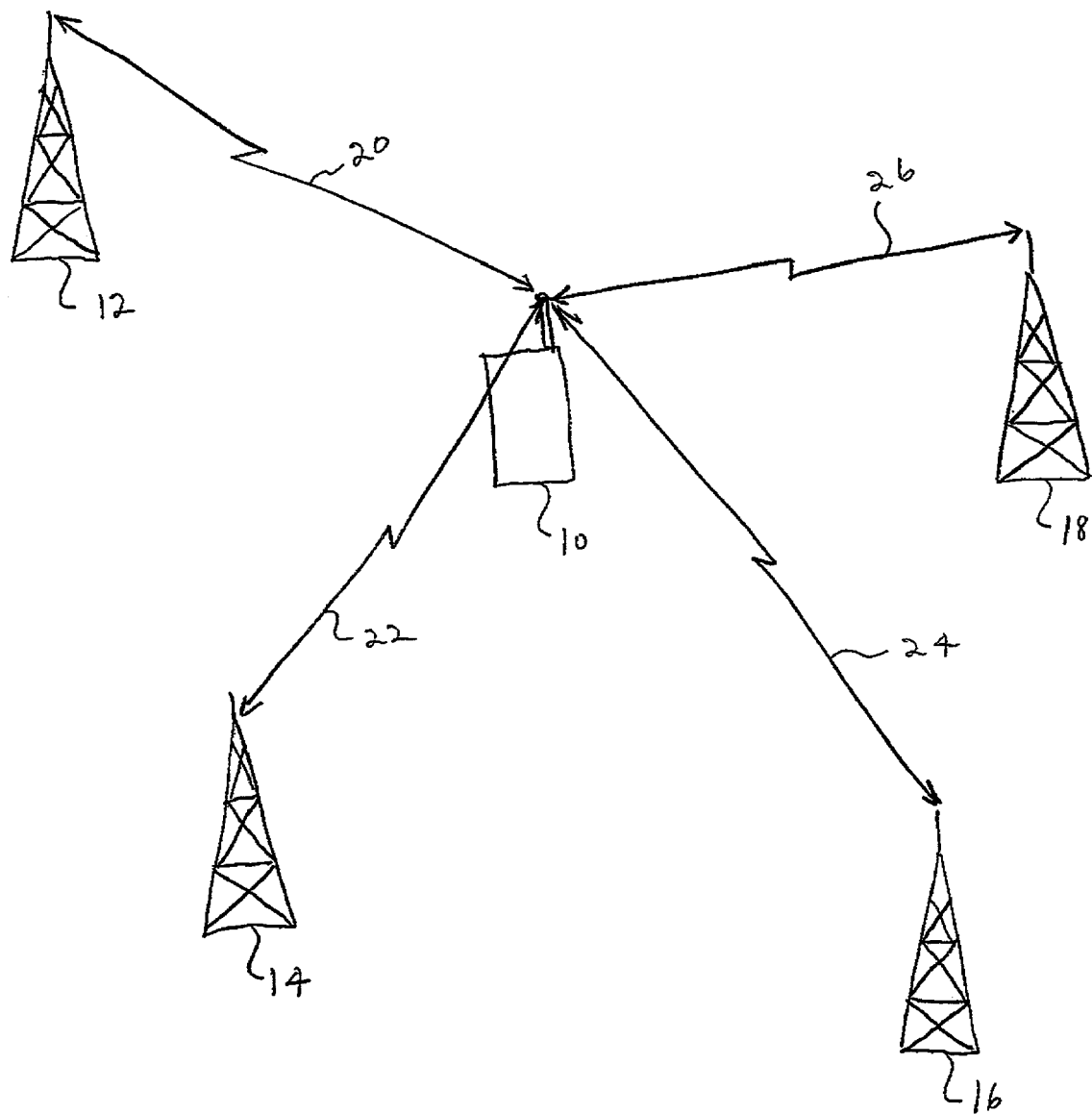
FIG. 1 is a block diagram illustrating a mobile unit and established communication links with a plurality of base transceiver stations (BTSs).

The present invention uses a mathematical modeling technique to more accurately determine the time of arrival of the signal transmitted from a base transceiver station (BTS). FIG. 1 is a diagram illustrating the operation of a wireless system using advanced forward link trilateration (AFLT) to determine the location of the wireless unit. As illustrated in FIG. 1, a wireless unit 10 is within range of a plurality of BTSs 12–18. To permit normal communication, such as voice communication, the wireless unit 10 establishes communication links 20–26 with the BTSs 12–18, respectively. The information derived in the process of establishing the communication links 20–26 may be used to estimate the time of arrival and thereby determine the location of the wireless unit 10 with respect to the BTSs 12–18. It should be noted that it is not necessary to establish communications with a BTS to measure its time of arrival. The wireless unit 10 can actually measure the time of arrival by simply listening to all the base stations. However, the data typically generated within the wireless unit 10 is not sufficiently accurate to determine the precise location of the wireless unit 10. The present invention derives more accurate time of arrival data that may be used to more precisely determine the location of the wireless unit 10.

Figure 2:
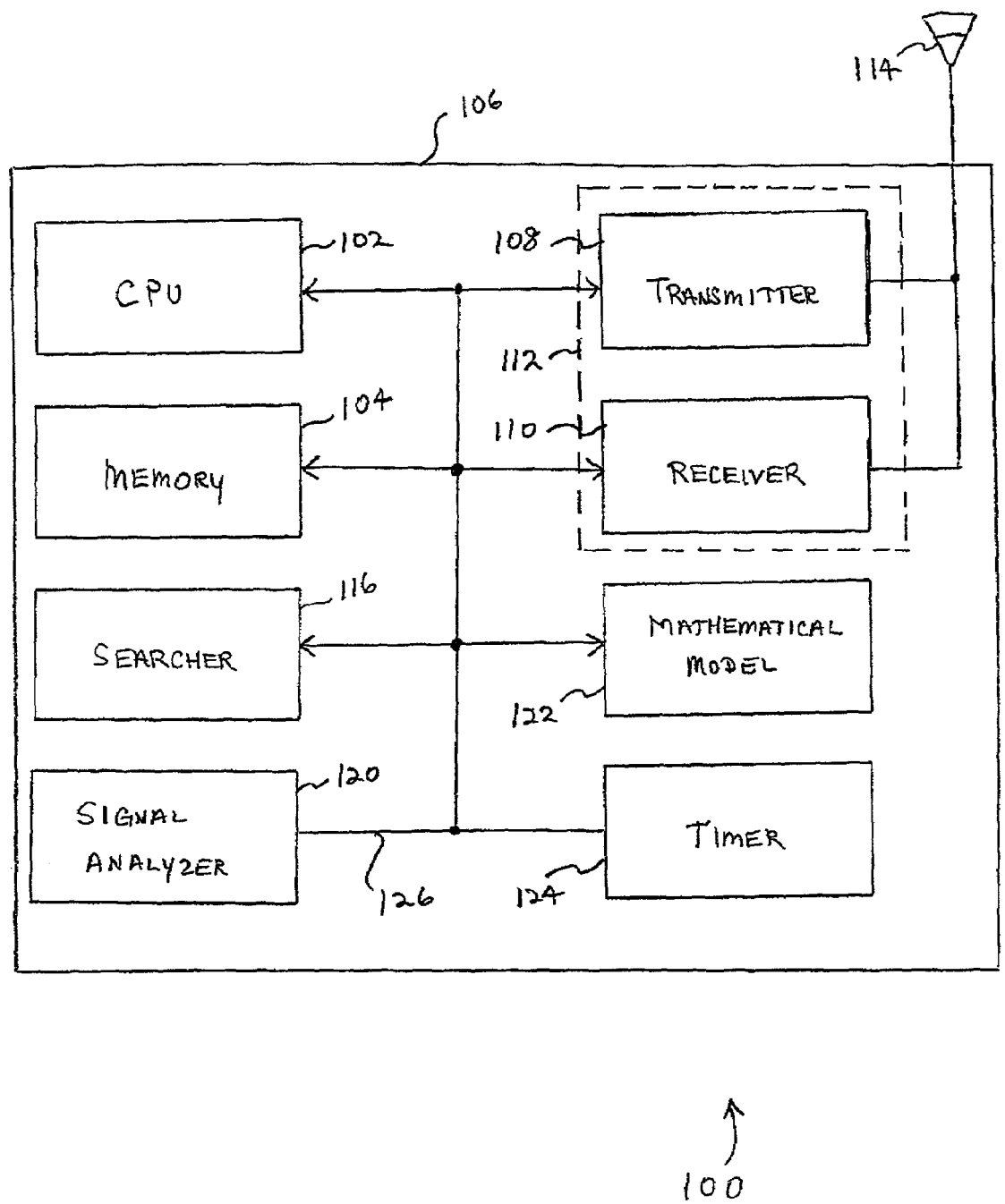
FIG. 2 is a functional block diagram of a mobile unit implementing the present invention.

The present invention is embodied in a system 100 illustrated in the functional block diagram of FIG. 2. The system 100 includes a central processing unit (CPU) 102, which controls operation of the system. Those skilled in the art will appreciate that the CPU 102 is intended to encompass any processing device capable of operating the telecommunication system. This includes microprocessors, embedded controllers, application specific integrated circuits (ASICs), digital signal processors (DSPs), state machines, dedicated discrete hardware, and the like. The present invention is not limited by the specific hardware component selected to implement the CPU 102.

The system also preferably includes a memory 104, which may include both read-only memory (ROM) and random access memory (RAM). The memory 104 provides instructions and data to the CPU 102. A portion of the memory 104 may also include non-volatile random access memory (NVRAM).

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a BTS (e.g., the BTS 12 of FIG. 1.

The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein except as it relates specifically to the present invention.

In an implementation for a CDMA device, the system also includes a searcher 116 to detect and quantify the level of signals received by the receiver 110. The searcher 116 detects one or more parameters, such as a total energy, pilot energy per pseudo noise (PN) chip, power spectral density, and other parameters, as is known in the art. As will be described in greater detail, the searcher 116 performs a correlation analysis to determine time of arrival (TOA) from a location, such as the BTS 14 (see FIG. 1).

The searcher 116 performs a correlation analysis between a reference signal and a received signal and generates a correlation output signal. A signal analyzer or modeling processor 120 analyzes the correlation signals and uses a mathematical model 122 to generate accurate TOA data.

The system 100 includes a timer 124 to provide system timing that is used to measure delay times in the arrival of signals from different sources (e.g., the BTSs 12–18). The timer 124 may be a stand-alone device or part of the CPU 102.

The various components of the system 100 are coupled together by a bus system 126, which may include a power bus, a control signal bus, and a status signal bus in addition to a data bus. However, for the sake of clarity, the various buses are illustrated in FIG. 2 as the bus system 126.

One skilled in the art will appreciate that the system 100 illustrated in FIG. 2 is a functional block diagram rather than a listing of specific components. For example, although the searcher 116 and signal analyzer 120 are illustrated as two separate blocks within the system 100, they may be in fact embodied in one physical component, such as a digital signal processor (DSP). They may also reside as program codes in the memory 104, such code being operated on by the CPU 102. The same considerations may apply to other components listed in the system 100 of FIG. 2, such as the timer 124.

Figure 3:
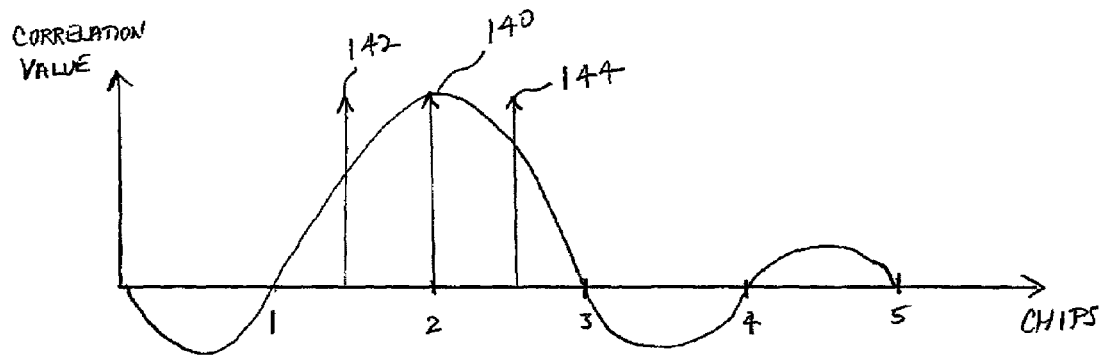
FIG. 3 is a waveform illustrating the detection of a signal from a BTS.

Operation of the components shown in the system 100 of FIG. 2 will be explained with reference to FIGS. 3–6. FIG. 3 is a waveform-timing diagram illustrating examples of the correlation pulses generated by the searcher 116. To assist in proper understanding of the present invention, a brief description of time of arrival processing using, by way of example, a CDMA mobile unit, will be presented. A mobile unit (e.g., the mobile unit 10 in FIG. 1) implementing the system 100 of FIG. 2 is initially assigned a pseudo noise (PN) code. The PN code may be stored in the memory 104 as a local reference. When a base station (e.g., the BTS 12) transmits data to the mobile unit 10, the base station transmits the PN code. The system 100 continuously searches for a correlation between the local reference (i.e., the stored PN code) and transmitted data (i.e., the transmitted PN code).

As is well known in the art, all the transmitters (e.g., the BTSs 12–18) transmit the same PN code, but the start of transmission of the PN code from the transmitter in each BTS is delayed in time by a precisely known offset. The time offsets are measured in multiples of 64 chips. As those skilled in the art will appreciate, a "chip" is a single piece of data in the PN sequence. Because the data is transmitted at a known rate, chips may be used as a measure of time. Although the present description may be characterized in actual units of time, it is more convenient to refer to the time in terms of chips because the system 100 performs its analysis and measurements in terms of chips.

The PN offsets are selectively assigned to transmitters so that the offsets in a geographic region are spread out as much as possible to avoid interference between transmitters. The transmitters (e.g., the transmitters in the BTSs 12–18) may be identified by transmitted identification data, but are sometimes labeled by their PN offset time. For example, the transmitter in BTS 12 may be identified as PN 300 to indicate that it transmits the PN code at an offset of 300. It should be understood, however, that regardless of how the transmitters are labeled, the relative offset of each with respect to each other can be established from the information encoded in the signals. The receiver 110 (see FIG. 2) in the mobile unit 10 will detect the PN from each of the transmitters in the geographic area (e.g., the transmitters in the BTSs 12–18).

Figure 4:
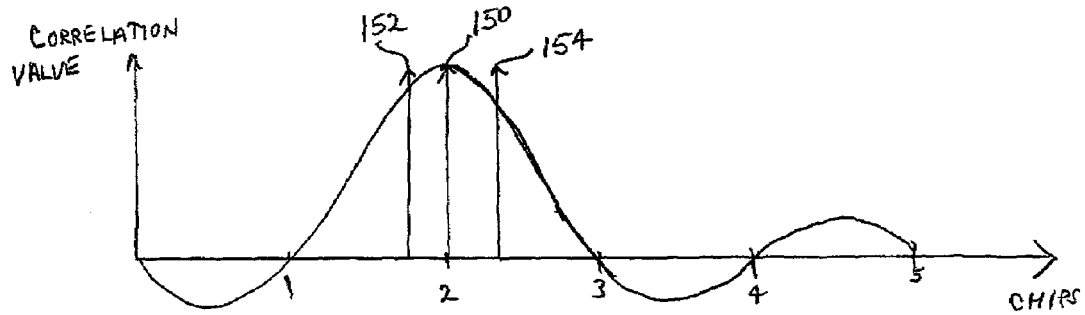
FIG. 4 is a waveform illustrating the detection of a signal from a BTS using a higher resolution than the waveform in FIG. 3.

The searcher 116 shifts the stored reference until a correlation is detected between the stored reference and the transmitted data. The degree of shift of the stored reference is selected to optimize the acquisition rate and provide sufficient synchronization between the wireless device 10 and a particular BTS (e.g., the BTS 12 of FIG. 1). This is illustrated in the waveforms of FIGS. 3 and 4. In FIG. 3, the searcher 116 shifts the PN code one chip at a time. In the example illustrated in FIG. 3, a correlation waveform 140 has a maximum value at chip 2.

A number of different measures, such as total energy, pilot energy per PN chip or power spectral density, may be used as the correlation value. One commonly used measure is simply the received signal strength such as may be indicated by the received signal strength index (RSSI). Those skilled in the art will recognize that the searcher 116 (see FIG. 1) produces numeric values related to the correlation between the stored PN code and the transmitted PN code. The waveform 140 results from plotting the correlation values from the searcher at different chip values.

The waveform 140 closely resembles the mathematical function $$\frac{\sin \pi x}{\pi x} \qquad (1)$$

which may be used to accurately characterize the correlation function. This function is common in engineering and is sometimes referred to as a sinc x function.

It is possible to determine the actual peak of the sinc x function using a sinc x reconstruction filter. However, such a filter requires a large number of samples for accurate reconstruction. It may be possible to produce a reasonable result with samples of approximately twenty chips to generate a minimally acceptable result. However, such a process is time-consuming and computationally difficult. More conventional searchers simply look for the peak energy at a sampled data point and presume the actual peak to coincide with the sampled data point.

The accuracy of peak location by a conventional searcher is limited by the amount (measured in chips) that the stored reference code is shifted by the search process. In the example illustrated in FIG. 3, the searcher shifts the PN code one chip at a time. As a result, the accuracy of peak determination is limited to one-half that amount (i.e., ±½ chip). For example, the actual peak correlation value may be at a point 142, illustrated in FIG. 3 as occurring just past 1½ chips. Because the conventional searcher only shifts the PN code by one chip at a time, the conventional searcher would still determine the peak to be located at two chips rather than at the actual peak 142. Similarly, the actual peak may be delayed and occur at a point 144. Again, because of the limitation in measurement, the conventional searcher would indicate the peak as occurring at two chips rather than 2.4 chips.

Thus, the actual peak may occur somewhere between 1½ chips and 2½ chips. If the actual peak was at a location greater than 2½ chips, the value measured at chip 3 would exceed that of chip 2 and thus the sinc x function would have a peak located at chip 3. Therefore, if the searcher uses one-step increments, the resolution is limited to ½ chip. As noted above, the increment size (in chips) can be made arbitrarily small, but with the resultant increase in acquisition time since the searcher must perform significantly more calculations.

A one-chip increment may be satisfactory for some CDMA systems. However, greater reliability is achieved when the system 100 uses ½-chip increments. That is, the conventional searcher shifts the stored PN code ½-chip at a time and performs correlation analysis. This is illustrated in the waveform of FIG. 4 where a correlation waveform 150 is centered at chip 2. That is, the maximum numeric value was detected by the conventional searcher at chip 2. As discussed above, the resolution of the search process is limited to ±¼-chip when using a ±½-chip increment in the PN code. Thus, the actual peak may be as early as 1.75 chips, as indicated by reference numeral 152 or as late as 2.25 chips, as indicated by a reference numeral 154. In either case, the conventional searcher will indicate the peak occurring at two chips since the resolution of the conventional searcher in this example is limited to ±¼ chip.

As can be appreciated, other resolutions may be used to determine the correlation peak with the desired level of accuracy. For typical CDMA voice communications, ±¼-chip resolution is generally sufficient. However, ±¼-chip resolution provides unsatisfactory results for position location. Based on radio signal propagation measurements, ±¼-chip resolution translates into a possible error of ±60 meters when determining the distance from a particular BTS. When one considers that distances from multiple BTSs (e.g., the BTSs 12–18 of FIG. 1) must be determined, a ±60-meter error in each distance measurement results in an unacceptable degree of inaccuracy for position determination.

The present invention provides accurate time of arrival data without the need for a sinc x reconstruction filter and the accompanying extensive processing associated therewith. As will be discussed in more detail below, the searcher 116 (see FIG. 2) calculates correlation values. The signal analyzer 120 uses a small number of correlation values and the mathematical model 122 to accurately determine the TOA.

The searcher 116 (see FIG. 2) calculates a correlation value every ½-chip, resulting in a resolution of ±¼ chip. The output of the searcher 116 is a value indicative of the received signal strength at each particular ½ chip interval. The signal strength value is sometimes referred to as a received signal strength index (RSSI), as is known in the industry. However, as noted above, other measures may be used for the correlation value and generated by the searcher 116.

In a conventional embodiment, the time of arrival is generally determined to be the time offset of the correlation value having the maximum RSSI. However, as noted above, the actual peak may occur in-between the particular points in time at which measurements are taken. That is, the actual peak value may fall between the ½-chip intervals used by the searcher 116. It is possible to use the various RSSI values at each of the ½ chip intervals and fit them to a curve corresponding to the sinc x function. However, such curve fitting is a burdensome task that cannot be readily done with the limited computing power available in the typical wireless device 10. Furthermore, even with a more powerful processor, the time-consuming task of curve fitting cannot be readily done in real time to provide the desired results.

The system 100 uses the mathematical model 122 to simulate the general curve of the sinc x function. The shape of the curve and the actual peak can be readily determined using a relatively low number of sample points. In one embodiment, the sinc x function is modeled by a simple quadratic function having the form:

$$y(x)=ax^2+bx+c \qquad (2)$$

where y(x) equals the correlation output value (e.g., RSSI) as a function of x, x equals a time offset, and a, b, and c are coefficients. The coefficients a, b, and c may be readily determined using the correlation values at three sample points. The first sample point is the time offset at which the maximum signal level was detected. This is sometimes referred to as the "on-time" energy value and may be mathematically referred to with respect to equation (2) above as y(0). The two remaining values are the correlation values at adjacent sample points. In the example above wherein the searcher 116 searches at ½-chip increments, the correlation value at ½ chip before the on-time value and ½ chip after the on-time value are used to determine the coefficients a, b, and c. These may be referred to as the "early" energy value and a "late" energy value and are referred to with respect to equation (2) above as y(−0.5) and y(0.5), respectively.

The coefficients a, b, and c may be readily determined using the following:

$$a=2y(0.5)+2y(-0.5)-4y(0) \qquad (3);$$

$$b=y(0.5)-y(-0.5) \qquad (4);$$

and $$c=y(0) \qquad (5).$$

Figure 5:
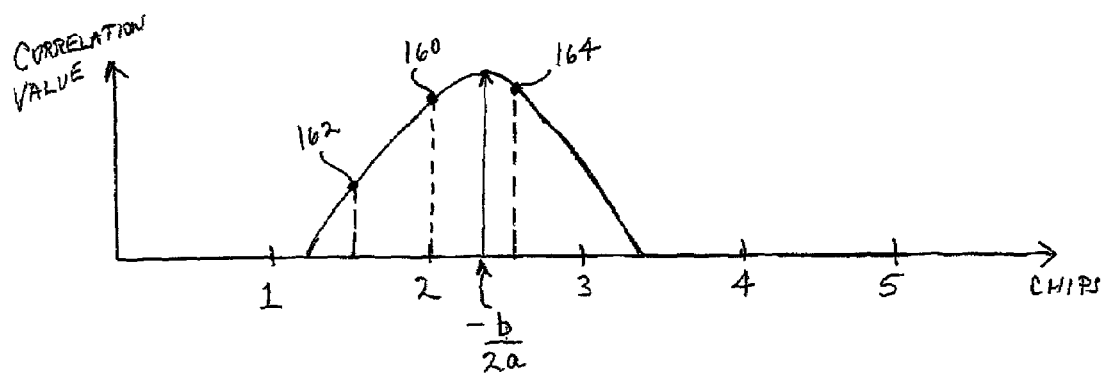
FIG. 5 is a waveform illustrating a modeling function used by the present invention to more accurately determine the time of arrival.

The modeling of the sinc x function by quadratic equation is illustrated in the waveform of FIG. 5 where the maximum correlation value (e.g., RSSI) was detected at chip 2 and is indicated by a reference numeral 160. The correlation value for the early energy value (i.e., at 1½ chips) is indicated by a reference numeral 162, while the correlation value for the late energy value (i.e., at chip 2.5) is indicated by a reference numeral 164. The correlation values at the points 160–164 may be inserted in equations (3)–(5) above to determine the values for the coefficients a, b, c. Looking at the wave form of FIG. 5, it is possible to determine that the peak value is somewhere between chip 2 and 2.5. However, it is possible to determine the exact location of the peak using simple mathematics. Equation (2) is a simple quadratic equation whose derivative may be expressed by $$y'(x)=2ax+b \qquad (6).$$

The slope of the equation is equal to zero at the peak. By setting equation (6) to zero, we may solve for x and find that:

$$x = \frac{-b}{2a}. \qquad (7)$$

Thus, the peak may be readily determined by calculating the coefficients a and b.

The process described above is relatively simple as compared with the process of curve fitting to the sinc x function. Once the coefficients a and b are determined, the location of the actual peak of the curve may be readily determined using simple division operation. As is known in the art, a division operation is generally simple for a microprocessor, but can be more difficult to execute in a DSP. As an alternative to the calculation of equation (7), it is possible to determine the peak position using an iterative technique. The advantage of an iterative technique is that it avoids the necessity of performing a division operation. A simple example algorithm for determining the position of a peak based on three data sample points (i.e., the early energy correlation value, the on time energy correlation value, and the late energy correlation value).

```
/* Input energies given by early, ontime, and late */
e1 = early + late − 2*ontime;
e2 = late − early;
compare = e1 + (2&thsp;(m−1))*abs(e2);
relative_position = 0;
while (compare >=0)
{
    relative_position += 1/(2&thsp;m);
    compare += 2*e1;
}
relative_position *= sign(e2);
```

The algorithm illustrated above is generalized to a resolution of $$\frac{1}{2^m}$$

chips. The simplified implementation is ideal for fixed-point processors, and is based on the second order approximation of the received pulse shape.

In most applications, the second order model of equation (2) is generally satisfactory for determining the time of arrival and provides an acceptable degree of accuracy in determining the position of the wireless unit 10 (see FIG. 1) using conventional AFLT techniques. However, if greater accuracy is desired, it is possible to provide a higher order mathematical model to simulate the sinc x function. For example, a third order equation may more closely model the desired function. Those skilled in the art will recognize that high order functions will require a greater number of sample points in order to determine the coefficients. However, the mathematical modeling of the sinc x function may still be performed more efficiently by the present invention than by a sinc x reconstruction filter. The principles of the present invention may be generalized to third order or any other higher order model. As noted above, the second order function is selected as a tradeoff between accuracy and processing time. However, these processes are more efficient than curve fitting a number of data points to the sinc x function. It should be noted that, in the case of a quadratic equation, the three calculated data points (i.e., the early energy value, the on-time energy value, and the late energy value) all intersect with the actual sinc x function and thus provide an acceptable degree of accuracy in determining the precise location of the peak.

Figure 6:
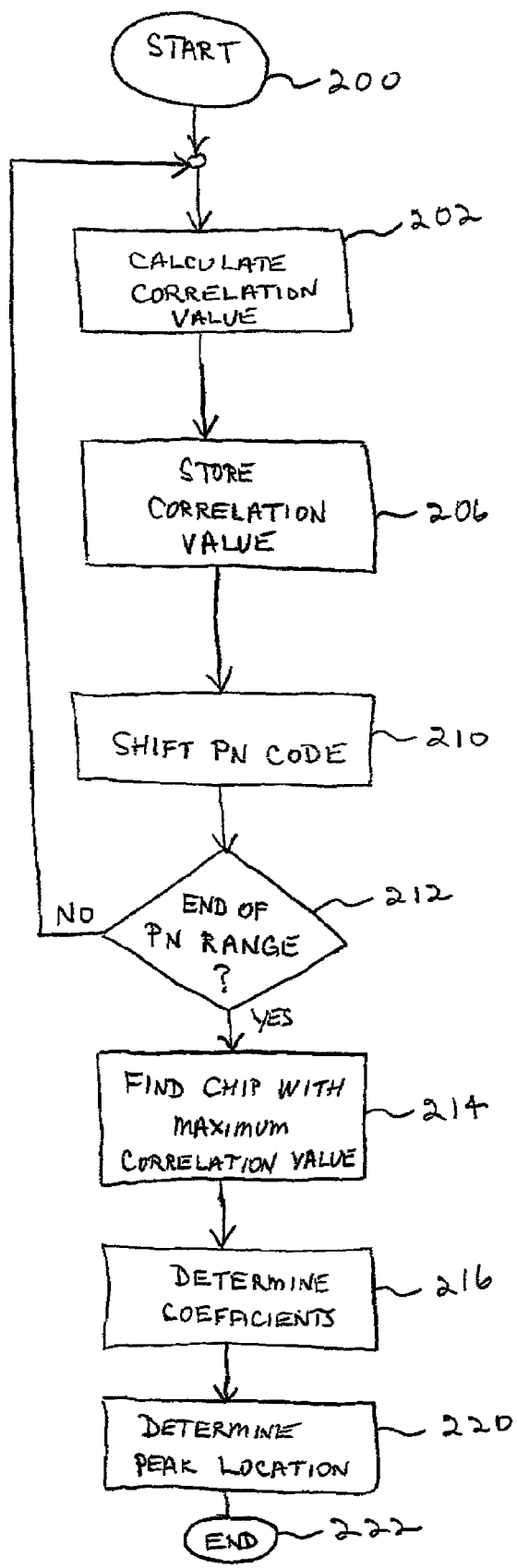
FIG. 6 is a flowchart illustrating the operation of the system of FIG. 2.

The operation of the system 100 is illustrated in the flow chart of FIG. 6 where at a start 200, the wireless unit 10 is under power. In step 202, the system 100 calculates correlation value. As is known in the art and discussed briefly above, the correlation value may be indicated by many different types of measurements, such as total energy, pilot energy per PN chip, RSSI, or the like. The wireless unit 10 compares a stored PN code with a PN code received by the receiver 110 (see FIG. 2). If the PN codes match, a relatively high correlation value will be calculated in step 202. The system 100 stores the calculated correlation value in step 206 and moves to step 210 to shift the PN code. As previously discussed, the PN code may be shifted in any desirable increment of chips. For example, it is common to shift the PN code ½-chip at a time across a range of PN values.

In decision 212, the system determines whether the shifted PN code is at the end of the range of PN values. If the shifted PN is not at the end of the range of PN values, the result of decision 212 is NO. In that case, the system returns to step 202 to calculate a new correlation value for the shifted PN code. If the shifted PN code is at the end of the acceptable range of PN values, the result of decision 212 is YES. In that event, in step 214, the system 100 analyzes the stored correlation values to find the chip with the maximum correlation value.

In step 216, the system 100 uses the predetermined mathematical model 122 (see FIG. 2) to determine coefficients using the maximum correlation value and correlation values at one or more adjacent measurement intervals in either direction. In an exemplary embodiment, the mathematical model is a quadratic function having three coefficients (i.e., a, b, and c). The three coefficients may be readily determined using the maximum correlation value and correlation values at adjacent measurement points, such as, by way of example, ½-chip before the maximum (i.e., the early energy value) and ½-chip after the maximum (i.e., the late energy value).

In step 220, the system 100 determines the peak location with the desired degree of accuracy. As noted above, the actual peak value may be calculated analytically using, by way of example, the mathematical formula of equation (7). Alternatively, the peak location may be determined in an iterative process, such as described above. The process ends at 222 with the peak location having been determined to the desired degree of accuracy.

With accurate time of arrival data, it is possible to accurately determine the location of the wireless unit 10. The actual process of determining location using AFLT is known in the art and need not be described herein. However, it follows that the accurate time of arrival data provided by the system 100 results in a more accurate calculation of the location of the wireless unit.

It is to be understood that even though various embodiments and advantages of the present invention have been set forth in the foregoing description, the above disclosure is illustrative only, and changes may be made in detail, that remain within the broad principles of the invention. Therefore, the present invention is to be limited only by the appended claims.

What is claimed is:

1. A system to determine signal time of arrival in a wireless communication system, comprising:
a searcher configured to analyze received signals to determine a correlation signal level at predetermined points in time, the searcher configured to determine a maximum signal level at a selected one of the predetermined points in time; and
a modeling processor configured to generate a second order polynomial mathematical model of a predetermined response function using the maximum signal level at the selected one of the predetermined points in time and correlation signal levels from predetermined points in time adjacent the selected one of the predetermined points in time, the modeling processor configured to determine a time associated with a peak correlation signal level based on the mathematical model, and further configured to determine a time of arrival of the received signals based on the time associated with the peak correlation signal level, an offset time encoded in the received signals, the mathematical model, and an iterative algorithm that avoids a division operation.

2. The system of claim 1 wherein the correlation signal levels are based on received signal strength of the received signals.

3. The system of claim 1, wherein the offset time encoded in the received signals identifies a source of the received signals.

4. The system of claim 1, further comprising a timer configured to provide system time used to measure the offset time.

5. The system of claim 1 wherein the mathematical model is a second-order mathematical function with three coefficients, and wherein the modeling processor is configured to determined the three coefficients in the mathematical model based on the maximum signal level at the selected one of the predetermined points in time and two correlation signal levels from predetermined points in time adjacent the selected one of the predetermined points in time.

6. The system of claim 1 wherein the maximum signal level at the selected one of the predetermined points in time and the correlation signal levels from the predetermined points in time adjacent the selected one of the predetermined points in time are used to determine coefficients in the mathematical model.

7. The system of claim 6 wherein the coefficients in the mathematical model are used to determine the time associated with the peak correlation signal level based on the mathematical model.

8. The system of claim 1 wherein the mathematical model is a quadratic function having the form: $y(x)=ax^2+bx+c$.

9. The system of claim 8 wherein the modeling process is configured to determine coefficients in the mathematical model based on the maximum signal level at the selected one of the predetermined points in time and correlation signal levels from predetermined points in time adjacent the selected one of the predetermined points in time.

10. The system of claim 9 wherein the modeling processor is configured to determine a time associated with the peak correlation signal based on the coefficients in the mathematical model.

11. A system to determine signal time of arrival in a wireless communication system, comprising:
a searcher configured to analyze received signals to determine correlation signals level at predetermine points in time, the searcher configured to determine a maximum signal level at a selected one of the predetermined points in time; and
a modeling processor configured to generate an nth order polynomial, n being greater than two, mathematical model of a predetermined response function based on the maximum signal level at the selected one of the predetermined points in time and correlation signal levels from predetermined points in time adjacent the selected one of the predetermined points in time, the modeling processor configured to determine a time associated with a peak correlation signal level based on the mathematical model, and configured to determine coefficients in the mathematical model based on the maximum signal level and correlation signal levels from predetermined points in time adjacent the selected one of the predetermined points in time, and wherein the modeling processor is further configured to determine a time of arrival of the received signals based on at least the time associated with the peak correlation signal.

12. A system for determining signal time of arrival in a wireless communication system, comprising:

analysis means for analyzing received signals to determine correlation signal levels at predetennined points in time and for determining a maximum signal level at a selected one of the predetermined points in time; and modeling means for generating a second-order mathematical model of a predetermined response function based on the maximum signal level at the selected one of the predetermined points in time and correlation signal levels from predetermined points in time adjacent the selected one of the predetermined points in time, determining a time associated with a peak correlation signal level based on the mathematical model, and further for determining a time of arrival of the received signals based on the time associated with the peak correlation signal level, an offset time encoded in the received signals, the mathematical model and an iterative algorithm that avoids a division operation.

13. The system of claim 12 wherein the correlation signal levels are based on received signal strength of the received signals.

14. The system of claim 12 wherein the modeling means uses the maximum signal level at the selected one of the predetermined points in time and correlation signal levels from predetermined paints in time adjacent the selected one of the predetermined points in time to determine coefficients in the mathematical model.

15. The system of claim 14 wherein the coefficients in the mathematical model are used to determine the time associated with the peak correlation signal level based on the mathematical mode.

16. A system for determining signal time of arrival in a wireless communication system, compnsing:

analysis means for analyzing received signals to determine a correlation signal level at predetermined points in time and for determining a maximum signal level at a selected one of the predetermined points in time; and modeling means for generating an nth order mathematical model, n being greater than two, of a predetermined response function using the maximum signal level at the selected one of the predetermined points in time and correlation signal levels from predetermined points in time adjacent the selected one of the predetermined points in time, the mathematical model configured to determine a time associated with a peak correlation signal level and further for determining a time of arrival of the received signals based on at least the time associated with the peak correlation signal.

17. A method for determining signal time of arrival in a wireless communication system, comprising:

analyzing received signals to determine a correlation signal level at predetermined points in time;

determining a maximum signal level at a selected one of the predetermined points in time;

generating a second order mathematical model of a predetermined response function using the maximum signal level at the selected one of the predetermined points in time and correlation signal levels from predetermined points in time adjacent the selected one of the predetermined points in time;

determining a time associated with a peak correlation signal level based on the mathematical model;

determining an offset time encoded within the received signals, the offset time identifying a source of the received signals; and determining a time of arrival of the received signals based on the time associated with the peak correlation signal level, the offset time, the mathematical model and an iterative algorithm that avoids a division operation.

18. The method of claim 17 wherein the correlation signal levels are based on received signal strength of the received signals.

19. The method of claim 17 wherein coefficients in the second-order mathematical function are used to determine the time associated with the peak correlation signal level based on the mathematical model.

20. The method of claim 17 wherein the maximum signal level at the selected one of the predetermined points in time and correlation signal levels from predetermined points in time adjacent the selected one of the predetermined points in time are used to determine coefficients in the mathematical model.

21. The method of claim 20 wherein the coefficients in the mathematical model are used to determine the time associated with the peak correlation signal level based on the mathematical model.

22. A method for determining signal time of arrival in a wireless communication system, comprising:

receiving wireless signals on an antenna;

analyzing the received signals to determine a correlation signal levels at predetermined points in time;

determining a maximum signal level at a selected one of the predetermined points in time;

generating an nth order mathematical model, n being greater than two, of a predetermined response function using the maximum signal level at the selected one of the predetermined points in time and correlation signal levels from predetermined points in time adjacent the selected one of the predetermined points in time; and determining a time associated with a peak correlation signal level based on the mathematical model, and determining coefficients of the mathematical model based on the maximum signal level at the selected one of the predetermined points in time and correlation signal levels from predetermined points in time adjacent the selected one of the predetermined points in time, and determining a time of arrival of the received signals based at least on the time associated with the peak correlation signal level.

23. An article comprising a machine readable medium having stored thereon executable instructions, that, when executed cause one or more machines to perform operations comprising:

receiving correlation signal levels at predetermined points in time;

generating a maximum signal level at a selected one of the predetermined points in time;

generating a second order mathematical model of a predetermined response function using the maximum signal level at the selected one of the predetermined points in time and correlation signal levels from predetermined points in time adjacent the selected one of the predetermined points in time;

determining time information associated with a peak correlation signal level based on the mathematical model;
determining offset time information encoded within the received signals, the offset time identifying a source of the received signals; and
determining a time of arrival of the received signals based on the time information associated with the peak correlation signal level, the offset time information, the mathematical model and an iterative algorithm that avoids a division operation.

* * * * *